E. CASSELBERRY.
Winding Clocks.

No. 2,745.

Patented Aug. 2, 1842.

UNITED STATES PATENT OFFICE.

EVANS CASSELBERRY, OF ST. LOUIS, MISSOURI.

SELF-WINDING CLOCK.

Specification of Letters Patent No. 2,745, dated August 2, 1842.

*To all whom it may concern:*

Be it known that I, EVANS CASSELBERRY, of the city of St. Louis, State of Missouri, have invented a new and useful improvement in the mode of applying power to clocks and other combinations of machinery operated by springs for keeping the same wound up and in constant action, of which the following is a full and accurate description, reference being had to the accompanying drawings, making part of this specification, the same letters being used to designate each part in the separate drawings.

Figure 1:
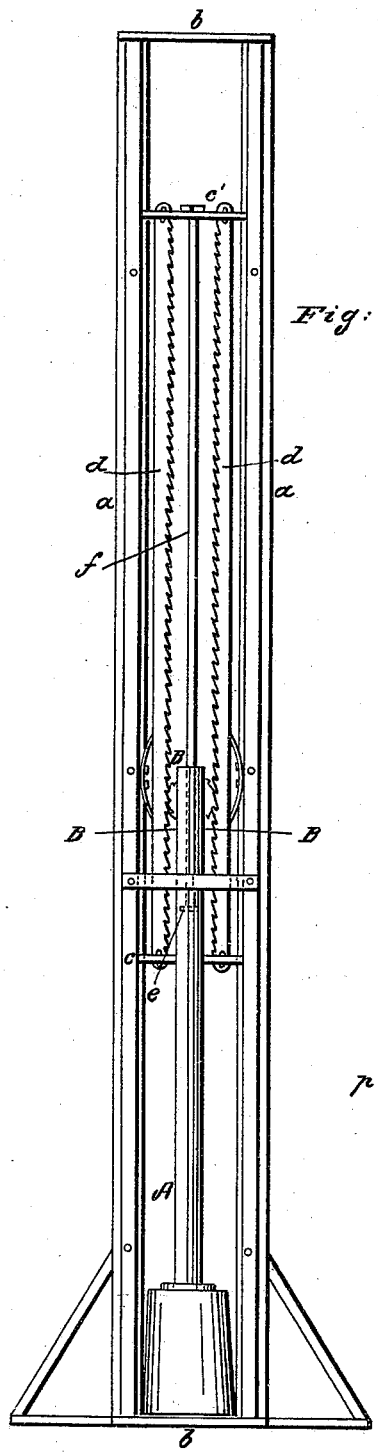

Figure 1 is a front view of my invention. $a\ a$ are vertical bars connected at top and bottom by horizontal cross bars $b\ b$. Within this frame another is placed consisting of two cross bars $c\ c'$ connected together by vertical bars $d\ d'$ having ratchet teeth on their inner edges. This frame moves up and down within that formed of the bars $a\ a$ and $b\ b$, the bars $a\ a$ forming ways on which the cross pieces $c\ c'$ of the movable frame slide up and down, the arrangements in this particular being similar to that used in steam engines with the sliding cross heads. Between the bars $d\ d'$ a ratchet wheel B is placed which is operated on the ascent of the movable frame by ratchet teeth on the inner edge of the bar $d'$ on its descent by ratchet teeth on the inner edge of the bar $d$, the teeth on these bars running in opposite directions to allow of this effect, those on the bar $d'$ running upward and those on the bar $d$ downward so that the wheel is operated as the movable frame rises by the teeth on the bar $d'$, the teeth on the bar $d$ slipping over the periphery of the wheel but on the descent of the frame engaging with the teeth of the wheel B and producing a continuous action of said wheel.

The frame formed of the bars $d$ and $d'$ connected by the cross pieces $c\ c'$ is moved up and down by the expansion and contraction of mercury or other fluids in a vertical cylinder A provided with a piston $e$ (shown in dotted lines) having a rod $f$ passing through the upper head of the cylinder to the upper cross piece $c'$ of the movable frame, by means of which arrangement the ordinary changes in the temperature of the atmosphere are taken advantage of and applied to the purpose specified, the expansion of the mercury as the temperature increases forcing the piston up and with it the movable frame so as to turn the wheel B by the teeth on the ratchet bar $d'$, while as the temperature diminishes and the mercury contracts leaving a greater or less vacuum below the piston the atmospheric pressure together with the weight of the movable frame causes the latter to descend and in so doing to turn the wheel B by the teeth on the ratchet bar $d$.

Figure 2:
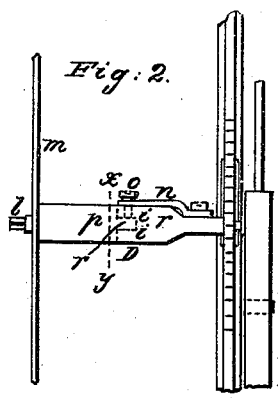
Figure 3:
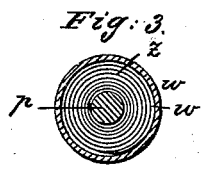

The wheel B is placed near the end of a horizontal shaft D. One end of this shaft is supported by and turned on the back plate $m$ Fig. 2 of the clock. The other or outer end of the shaft has its bearing in the upper part of the cylinder A. On a part marked $p$ of this shaft the spring of the clock is wound up by turning the wheel B, while the hollow movable cylinder which the spring gives motion to as it expands fits on this part of the shaft over the spring, the latter being coiled up between the shaft and the cylinder. This arrangement is shown in Fig. 3, $p$ being the shaft, $w$ the cylinder, and $s$ the spring. The shaft D is not formed of one continuous piece of wood or metal, but consists of two parts $p$ and $r$, Fig. 2, the part $r$ of the shaft on which the wheel B is placed having a hole bored in its inner end in the direction of its axis and receiving in this hollow one end of the part $p$ of the shaft D, which is turned down to adapt it to this hollow, as seen in Fig. 2, where D is the shaft, $r$ the outer portion on which the wheel is placed, $p$ the inner portion on which the spring is wound and over which the cylinder fits, $k$ the neck on the outer portion $p$ of the shaft D, and $i\ i$ the hollow on the inner end of the part $r$ of the shaft D which receives the neck $k$. The part $r$ of the shaft would if it were not for an arrangement to be described revolve without turning the part $p$ of said shaft. To prevent this there is a flat spring $n$, one end of which is secured to the portion $r$ of the shaft, while the other end is free, having a vertical pin $o$ on it which presses through an aperture in the hollowed end of the part $r$ of the shaft upon the surface of the neck $k$ within it, as shown in Fig. 2, where the pin $o$ is represented in dotted lines forced down upon the neck $k$ of the portion $p$ of the shaft, causing by its pressure both portions of the shaft, the parts $r$ and $p$, to turn together, but allowing when the spring is wound up (at which time the resistance will be at its maximum) the portion $r$ of the shaft to turn without moving the inner or portion $p$ of said shaft, by which means any excess of the power applied is disposed of without injury to the mechanism, the force of the spring $n$ being greater or less according to the strength of the spring employed to operate the mechanism.

My invention is only applicable to clocks of that construction in which a spring is wound upon a shaft over which a hollow cylinder fits, the spring in expanding giving motion to the cylinder. To clocks moved by weight, or springs acting in any other manner my invention is not applicable.

What I claim as my invention and desire to secure by Letters Patent is—

1. The mode herein described of applying the expansion and contraction of mercury or other fluids for the purpose of operating clocks and other combinations of mechanism driven by springs—that is to say I claim operating the shaft D on which the driving spring is wound up by means of the expansion and contraction of mercury acting in a cylinder A against a piston $e$, said cylinder and piston being combined by means of a movable frame (consisting of the bars $c\ c'$ and $d\ d'$) and a ratchet wheel B with the aforesaid shaft D, all as herein set forth.

2. I also claim the combination of the shaft D constructed in two parts, with the spring $n$ and pin $o$ on said spring as described for the purpose herein specified.

EVANS CASSELBERRY.

Witnesses:
M. DONNOVAN,
F. WHITNEY.